Jan. 19, 1954     D. R. RUEGSEGGER     2,666,488
FUSIBLE FASTENER
Filed Sept. 26, 1951
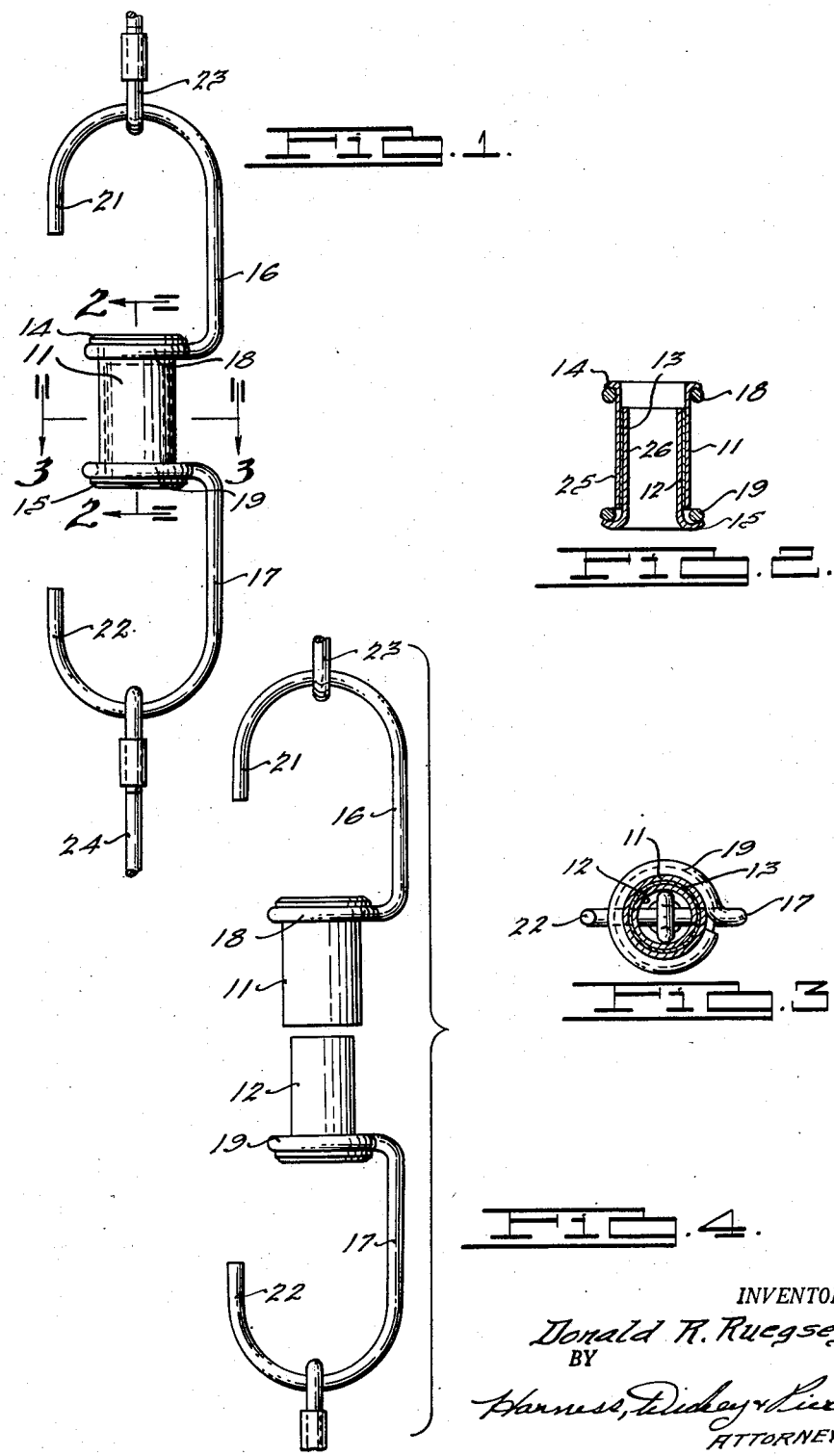
INVENTOR.
Donald R. Ruegsegger.
BY
ATTORNEYS.

Patented Jan. 19, 1954

2,666,488

UNITED STATES PATENT OFFICE 2,666,488

FUSIBLE FASTENER

Donald R. Ruegsegger, St. Clair Shores, Mich.

Application September 26, 1951, Serial No. 248,430

10 Claims. (Cl. 169—42)

This invention relates to fusible links of the type used to hold automatically closable fire doors, automatic fire extinguishers and the like so that these devices are operated upon a rise in the ambient temperature.

In the past, fusible links of this type have been provided which comprise two flat plates which are sweat-soldered together with a low melting-point solder, each of these plates being secured to one end of the structure so that the solder is subjected to a shearing stress. Upon a rise in ambient temperature the solder will melt, allowing the plates to pull apart. This construction has several disadvantages which limit its usefulness. For one thing, the plates are liable to be subjected to forces transverse to their planes, thereby subjecting the solder to a peeling or tearing action which may easily tear the bond when it is not desired to do so. Furthermore, it is necessary in such a construction to provide a relatively large area, so that sufficient solder is present to prevent movement under normal conditions.

It is an object of the present invention to overcome the disadvantages of previous constructions and to provide an improved fusible link construction which is extremely simple and economical to fabricate and which obviates the danger of subjecting the sweat-solder bond to other than direct shear stresses.

It is another object to provide an improved fusible link of the above character which uses parts of a less massive nature than has previously been possible, the joint area provided by these parts being substantially greater for the size of the parts.

It is also an object to provide an improved fusible link of this type which incorporates novel gripping or engaging members for the parts to be held, these engaging members permitting a full swiveling action with relation to the link elements, thereby preventing unwanted torsional or other forces on these elements.

It is a further object to provide an improved fusible link of the above nature in which the parts have an extremely slight mass and are thin walled, thereby enabling the heat to be absorbed over a relatively larger area, increasing the sensitivity of the device.

Other objects, features and advantages of the present invention will become apparent from the subsequent description taken in conjunction with the accompanying drawings.

In the drawings:

Figure 1 is a side elevational view of the improved fusible link, showing the hook elements for connection to the parts to be controlled;

Figure 2 is a cross-sectional view taken along the line 2—2 of Figure 1 and showing the construction of the link elements;

Figure 3 is a cross-sectional view taken along the line 3—3 of Figure 1 and showing the attaching means for the hooks; and Figure 4 is a view similar to Figure 1 but showing the parts in their separated condition.

The invention comprises, in general, a pair of link elements which comprise two hollow cylindrical members, such as conventional brass eyelets or the like. These elements are normally in telescoped relation and their surfaces are connected by such means as sweat-solder having a low melting point. Attached to the outer ends of these tubular elements is a pair of hooks or similar fasteners, these hooks being preferably swivelly mounted to the tubular link elements. These hooks are adapted to engage two operating portions of an assembly, such as an automatically closing fire door or an automatic fire extinguisher which is to be operated upon a predetermined rise in ambient temperature. Because of the telescoped nature of the link elements, the sweat-solder joint is subjected solely to direct shearing stresses, preventing failure of the link by peeling or tearing. The thin-walled eyelets are subjected to ambient temperature from both the inside and the outside because of their tubular nature, so that, upon a predetermined rise in ambient temperature, the forces on the hooks will cause the links to separate, operating the mechanism.

Referring more particularly to the drawings, the link elements comprise a pair of hollow tubular members 11 and 12, member 11 having a diameter slightly larger than member 12, so that it can be telescoped thereover. These elements, for example, may comprise thin brass bushings or eyelets and may, if desired, be of standard or conventional design. As is best seen in Figure 2, the elements 11 and 12 are partially telescoped and are joined by a sweat-solder connection 13, this solder having a known low melting point.

The outer ends of elements 11 and 12 are provided with radial flanges 14 and 15, respectively, these flanges extending outwardly. The flanges are adapted to retain a pair of engaging hooks 16 and 17 and, in particular, these hooks are provided with circular mounting portions 18 and 19, respectively, for retention by these flanges, as seen in Figure 3. The construction is such that these hooks are allowed a swiveling action with respect to the elements 11 and 12. The outer ends of hooks 16 and 17 are looped to provide engaging portions 21 and 22, respectively. The hooks are thus adapted to engage a pair of relatively movable members 23 and 24. For example, member 23 may be connected to a fire door mounted on an inclined track and element 24 to a stationary portion of the surrounding structure, so that a constant pulling force is present, tending to separate members 23 and 24.

The operation of the device will be apparent from the foregoing discussion. Normally, the sweat-solder joint 13 will be subjected to a direct shearing stress due to the constant separating force between members 23 and 24. It is also apparent that under no circumstances can this solder joint be subjected to torsional or other transverse stresses, since the telescoped nature of elements 11 and 12 inherently prevents such stresses from being applied. Furthermore, the swivel nature of the connection between hooks 16 and 17 and the link will prevent torsional stresses in the connection from occurring. The link will be subjected to ambient temperature both upon its outer surface 25 and its inner surface 26, since the link has a continuous annular shape. The relatively thin walls of elements 11 and 12 will quickly transfer any rise in ambient temperature to the solder connection 13. When this ambient temperature reaches the melting point of the solder, the elements 11 and 12 will instantaneously be pulled apart, as shown in Figure 4, allowing the attached mechanism to operate. It will be observed that there is absolutely no obstruction to the movement of these elements, and that all parts of the soldered joint will reach the predetermined temperature at the same time.

While it will be apparent that the preferred embodiment of the invention herein disclosed is well calculated to fulfill the objects above stated, it will be appreciated that the invention is subject to modification, variation and change without departing from the proper scope or fair meaning of the subjoined claims. For example, it is apparent that the cross-sectional shape of the link elements need not necessarily be circular but may be of rectangular, polygonal or similar shape within the principles of the invention.

What is claimed is:

1. In a device of the class described, a pair of relatively thin sheet metal tubular elements in telescopic relation and adapted to be subjected to an axial force tending to separate them, and a fusible joint connecting the facing surfaces of said tubular elements, said joint being subjected to a direct shear stress by said axial force.

2. In a device of the class described, a pair of open-ended tubular sheet metal elements in telescopic relation, attaching means on each of said elements and adapted to engage relatively movable outside members, and a fusible joint connecting the adjacent surfaces of said tubular elements to resist said movement.

3. A fusible link, comprising inner and outer open-ended tubular sheet metal elements in telescopic relation, a fusible metal joining the facing surfaces of said elements, and attaching means swivelly mounted on each of said elements, said attaching means being adapted to engage two relatively movable elements, whereby said tubular elements are subjected to a separating force.

4. A fusible link, comprising inner and outer tubular sheet metal elements in telescopic relation, a fusible metal connecting the facing surfaces of said elements, a radial flange at the outer end of at least one of said elements, and attaching means on each of said elements and adapted to connect said link between two relatively movable members, at least one of said attaching means comprising a portion over-engaging said flange and rotatable about the axis of said tubular elements without preventing flow of air into the interior of said elements, whereby said one attaching means is swivelly mounted to its tubular element.

5. A fusible link, comprising inner and outer tubular sheet metal elements in telescopic relation, a fusible metal connecting the facing surfaces of said elements, a radial flange at one end of each of said elements, and attaching means for connecting said link between two relatively movable parts, said attaching means comprising a pair of wire hooks having bent portions disposed behind said flanges, whereby said hooks are swivelly mounted on said tubular elements.

6. A fusible fastener comprising a pair of telescopically interfitted tubular elements, a fusible joint connecting the facing surfaces of said tubular elements, portions of at least one of said elements defining an opening extending into the interior of the inner one of said elements, and means for connecting tensioning members to said elements whereby they may be pulled apart axially in the event of fusing of said joint.

7. A fusible fastener comprising a pair of relatively thin sheet metal elements, each of said elements having an inner face and an outer face, said elements being nestedly interfitted with one another and having an inner face of one element adjacent to an outer face of the other element, a layer of fusible joint material between the adjacent faces and holding said elements together, and a coupling portion for connecting a held part to each of said elements.

8. A fusible fastener comprising a pair of relatively thin sheet metal elements, each of said elements having an inner face and an outer face, said elements being nestedly interfitted with one another and having an inner face of one element adjacent to an outer face of the other element, a layer of fusible joint material between the adjacent faces and holding said elements together, the other faces of said elements being exposed to the atmosphere, and a coupling portion for connecting a held part to each of said elements.

9. A fusible fastener comprising a pair of relatively thin sheet metal elements, each of said elements having an inner face and an outer face, said elements being nestedly interfitted with one another and having an inner face of one element adjacent to an outer face of the other element, a layer of fusible joint material between the adjacent faces and holding said elements together, and a coupling portion for connecting a held part to each of said elements, said coupling portions being spaced longitudinally with respect to said layer.

10. A fusible fastener comprising a pair of relatively thin sheet metal elements, each of said elements having an inner face and an outer face, said elements being nestedly interfitted with one another and having an inner face of one element adjacent to an outer face of the other element, a layer of fusible joint material between the adjacent faces and holding said elements together, the other faces of said elements being exposed to the atmosphere, and a coupling portion for connecting a held part to each of said elements, said coupling portions being spaced longitudinally with respect to said layer.

DONALD R. RUEGSEGGER.

References Cited in the file of this patent

UNITED STATES PATENTS

| Number | Name | Date |
|--------|------|------|
| 811,256 | Storey | Jan. 30, 1906 |
| 911,162 | Rockwood | Feb. 2, 1909 |
| 924,760 | Goldthwait | June 15, 1909 |
| 1,069,201 | Stephens | Aug. 5, 1913 |
| 1,083,019 | Leonard | Dec. 30, 1913 |
| 1,117,411 | Loepsinger | Nov. 17, 1914 |
| 1,953,582 | Belknap | Apr. 3, 1934 |